US008943496B2

(12) United States Patent
Faus et al.

(10) Patent No.: US 8,943,496 B2
(45) Date of Patent: Jan. 27, 2015

(54) PROVIDING A HOSTED APPLIANCE AND MIGRATING THE APPLIANCE TO AN ON-PREMISE ENVIRONMENT

(75) Inventors: Norman L. Faus, Raleigh, NC (US); David P. Huff, Raleigh, NC (US); Bryan M. Kearney, Raleigh, NC (US); James Michael Ferris, Cary, NC (US)

(73) Assignee: Red Hat, Inc., Raleigh, NC (US)

( * ) Notice: Subject to any disclaimer, the term of this patent is extended or adjusted under 35 U.S.C. 154(b) by 1142 days.

(21) Appl. No.: 12/131,004

(22) Filed: May 30, 2008

(65) Prior Publication Data

US 2009/0300601 A1    Dec. 3, 2009

(51) Int. Cl.
G06F 9/445    (2006.01)

(52) U.S. Cl.
CPC .................................. *G06F 9/44505* (2013.01)
USPC ......................................................... 717/176

(58) Field of Classification Search
CPC ........... G06F 8/61; G06F 9/4411; G06F 8/60; G06F 8/62
USPC ....................................................... 717/176
See application file for complete search history.

(56) References Cited

U.S. PATENT DOCUMENTS

| | | | |
|---|---|---|---|
| 6,367,077 B1 | 4/2002 | Brodersen et al. | |
| 6,578,199 B1 | 6/2003 | Tsou et al. | |
| 7,461,095 B2 | 12/2008 | Cohen et al. | |
| 222,806 A1 | 9/2009 | Faus | |
| 7,624,394 B1 | 11/2009 | Christopher, Jr. | |
| 7,945,897 B1 | 5/2011 | Cook | |
| 8,181,174 B2 | 5/2012 | Liu | |
| 2002/0086688 A1 | 7/2002 | Kang | |
| 2002/0129362 A1 | 9/2002 | Chang et al. | |
| 2003/0220835 A1* | 11/2003 | Barnes, Jr. ...................... | 705/14 |
| 2005/0044541 A1 | 2/2005 | Parthasarathy et al. | |
| 2006/0101451 A1 | 5/2006 | Fong | |
| 2006/0146991 A1* | 7/2006 | Thompson et al. .......... | 379/67.1 |
| 2006/0155735 A1 | 7/2006 | Traut et al. | |
| 2007/0053513 A1* | 3/2007 | Hoffberg ...................... | 380/201 |
| 2007/0074201 A1 | 3/2007 | Lee | |
| 2007/0078988 A1* | 4/2007 | Miloushev et al. ........... | 709/227 |
| 2007/0159650 A1* | 7/2007 | Takamatsu et al. .......... | 358/1.15 |
| 2007/0169079 A1 | 7/2007 | Keller et al. | |
| 2007/0245332 A1 | 10/2007 | Tal et al. | |
| 2008/0004904 A1* | 1/2008 | Tran .................................. | 705/2 |
| 2008/0022271 A1 | 1/2008 | D'Angelo et al. | |
| 2008/0052384 A1 | 2/2008 | Marl et al. | |
| 2008/0082601 A1 | 4/2008 | Meijer et al. | |

(Continued)

OTHER PUBLICATIONS

Office action for U.S. Appl. No. 12/040,834, mailed Jul. 18, 2011.

(Continued)

*Primary Examiner* — Li B Zhen
*Assistant Examiner* — Arshia S Kia
(74) *Attorney, Agent, or Firm* — Lowenstein Sandler LLP

(57) ABSTRACT

An appliance support module can be configured to build software appliances for use in a hosted environment. The appliance support module can be configured to build the hosted appliances based on a request by a user for the hosted appliances. The appliance support module can be configured to receive a request to migrate the hosted appliances to an on-premise system. To migrate the hosted appliance, the appliance support module can be configured to convert the hosted appliances into a format capable of being supported by the on-premise systems.

18 Claims, 6 Drawing Sheets

(56) References Cited

U.S. PATENT DOCUMENTS

| | | | |
|---|---|---|---|
| 2008/0086727 A1* | 4/2008 | Lam et al. | 718/1 |
| 2008/0215796 A1* | 9/2008 | Lam et al. | 711/100 |
| 2008/0263258 A1* | 10/2008 | Allwell et al. | 711/6 |
| 2009/0064086 A1 | 3/2009 | Faus | |
| 2009/0144718 A1* | 6/2009 | Boggs et al. | 717/170 |
| 2009/0217244 A1 | 8/2009 | Bozak et al. | |
| 2009/0217255 A1 | 8/2009 | Troan | |
| 2009/0222805 A1 | 9/2009 | Faus | |
| 2009/0222808 A1 | 9/2009 | Faus | |
| 2009/0249488 A1* | 10/2009 | Robinson et al. | 726/26 |
| 2009/0300164 A1* | 12/2009 | Boggs et al. | 709/224 |
| 2009/0300584 A1 | 12/2009 | Faus | |
| 2009/0300593 A1 | 12/2009 | Faus | |
| 2010/0306773 A1 | 12/2010 | Lee et al. | |
| 2011/0035733 A1 | 2/2011 | Horning et al. | |
| 2011/0170837 A1 | 7/2011 | Barnes, Jr. | |

OTHER PUBLICATIONS

Office action for U.S. Appl. No. 12/040,834, mailed Jan. 20, 2012.
Office action for U.S. Appl. No. 12/128,299, mailed Aug. 17, 2011.
Office action for U.S. Appl. No. 12/128,299, mailed Jan. 31, 2012.
Office action for U.S. Appl. No. 12/040,834, mailed Jun. 19, 2013.
Office action for U.S. Appl. No. 12/128,299, mailed May 6, 2013.

* cited by examiner

PROVIDING A HOSTED APPLIANCE AND MIGRATING THE APPLIANCE TO AN ON-PREMISE ENVIRONMENT

FIELD

This invention relates generally to products and services, more particularly, to systems and methods for software appliance related services and products.

DESCRIPTION OF THE RELATED ART

The proliferation of the World Wide Web through the Internet has made a wealth of products and services available to users to purchase and use nearly instantaneously. Vendors, service providers, manufacturers, third party distributors, etc., may have websites for the users to review and purchase their respective products and/or services and to obtain technical support for the product and/or services.

Typically, in addition to purchasing the software products and services, the user must also purchase hardware to serve as a platform for the software products and services, on-premise. Often, the user may not have the capital to purchase both software products and the hardware to support the products. As such, the users will purchase the software products and contract with third parities to host the software products. Eventually, the user may wish to move the hosted software products on-premise once they have capital to purchase the necessary hardware. The user, however, must reinstall the software products in the on-premise systems and migrate any data from the hosted system. This migration can be both costly and time consuming for the users. Thus, there is a need in the art for methods and systems that provide for migrating software products from a hosted environment to on-premise systems.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of information and service portals, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

According to various embodiments, in general, an appliance support module can be configured to build software appliances for use in a hosted environment. The appliance support module can be configured to build the hosted appliances based on a request by a user for the hosted appliances. The request can include a desired pre-built appliance or available applications to be included in a custom appliance. The appliance support module can be configured to build the hosted appliance by retrieving the pre-configured appliance. Additionally, to build the hosted appliance, the appliance support module can be configured to combine the applications with a minimum amount of an operating system to provide an execution platform for the applications. Additionally, the appliance support module can be configured to build the hosted appliances in a format supported by the hosted environment.

In embodiments, the appliance support module can be configured to receive a request to migrate the hosted appliances to an on-premise system. To achieve this, the appliance support module can be configured to retrieve the hosted appliances from the hosted environment. To migrate the hosted appliance, the appliance support module can be configured to convert the hosted appliances into a format capable of being supported by the on-premise systems. Additionally, to enhance migration, the hosted appliance can include metadata describing the configuration parameters of the hosted appliances. The metadata can be migrated with the converted appliances. Once converted, the appliance support module can provide the converted appliance to the on-premise system.

By allowing a user to build an appliance supported by a hosted environment, users can purchase and utilize software products without incurring the expense of purchasing hardware to support the appliances. Additionally, by providing a mechanism to migrate the hosted appliances, the user can easily and efficiently move the hosted appliances while saving time and resources in the process.

Figure 1:
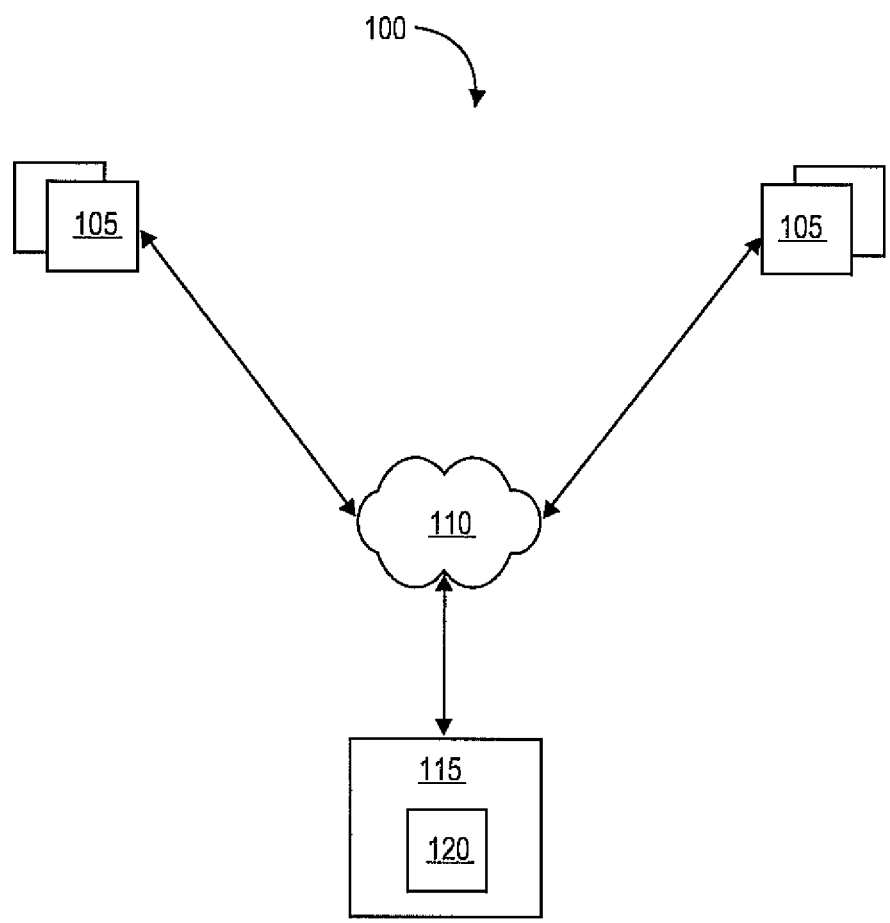
FIG. 1 depicts an exemplary system in accordance with an embodiment.

FIG. 1 illustrates an exemplary system 100 in accordance with an embodiment. It should be readily apparent to those of ordinary skill in the art that system 100 depicted in FIG. 1 represents a generalized schematic illustration and that other components may be added or existing components may be removed or modified. Moreover, system 100 may be implemented using software components, hardware components, or combinations thereof.

As shown in FIG. 1, system 100 includes users 105, a network 110 and a web service portal 115. Users 105 can be private individuals, employees of private business or public entities or other persons interested in accessing web service portal 115. Users 105 can access web service portal 115 using personal computers, personal mobile devices, workstations or other networked computing platforms.

Network 110 can be a combination of wide area and local area networks such as the Internet. Network 110 can be configured to provide a communication channel between users 105 and web service portal 115. Network 110 can implement a variety of network protocols to provide the communication channel such as Internet Protocol ("IP") Vx, ATM, SONET, or other similar network protocols.

Web service portal 115 can be configured to provide products and services to user 105 as well as provisioning, installation services, updates to software and hardware products and technical support. Web service portal 115 can, among other functions, provide a list of products such as software applications, software appliances and/or hardware devices as well as services such as installation, configuration, maintenance, etc., for users 105 to purchase. As a non-limiting example, web service portal 115 can also provide information for users to research, compare and purchase software, hardware and consulting services in support of those software and/or hardware purchases. Web service portal 115 can also be configured to provide support services, for free or by subscription, to those same software, service, and/or hardware purchases.

In accordance with various embodiments, web service portal 115 can be configured to provide an appliance support (AS) module 120 to provide software appliances to user 105 and support the software appliances.

Figure 2:
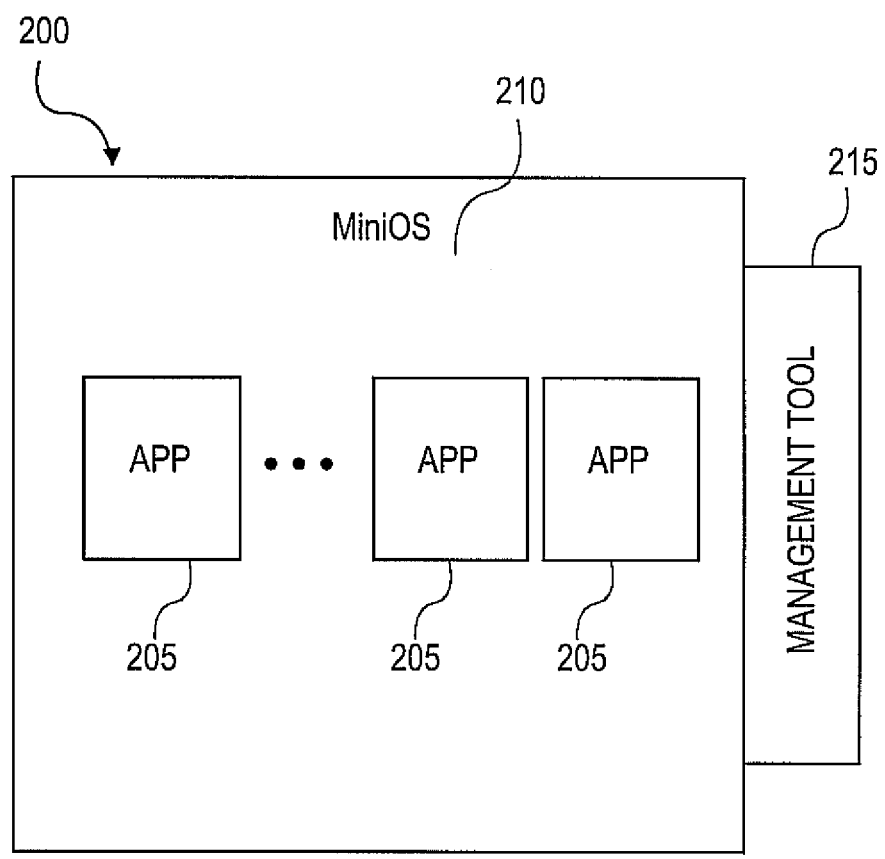
FIG. 2 illustrates an exemplary software appliance in accordance with various embodiments.

FIG. 2 shows an exemplary software appliance according to various embodiments. As shown, a software appliance 200 can comprise one or more applications 205 combined with a "minimum amount of an operating system" (MiniOS) 210 to allow application(s) 205 to run on a computing platform or in a virtual machine executing on a computing platform. MiniOS 210 can comprise a subset of the components of a complete OS that contains enough resources to support the application(s) 205 intended to be encapsulated with MiniOS 210. Software appliance 200 occupies less space than regular or self-standing applications and independent OSes, because MiniOS 210 includes a set of reduced features and components required to provide an application space for application(s) 205 of the software appliance.

Software appliance 200 comprises a binary image of application(s) 205 and selected MiniOS 210 contained in software appliance 200. The image contains the bits of software appliance 200 as installed on a computing platform. As such, to place software appliance 200 on computing platform, software appliance 200 only needs to be physically copied to the memory or storage of the computing platform and, then, configured to function with the computing platform or virtual machine running on the computing platform. In embodiments, software appliance 200 can be distributed via media such as CD-ROM, DVD-ROM, high-definition format discs or flash media, transmitted via a network, or can be downloaded from a Web site or other location.

Software appliance 200 can streamline the distribution of applications by minimizing the tasks typically associated with installation, configuration and maintenance. Software appliance 200 is completely functional as a self-contained unit, and requires no separately installed or configured OS to function. Inside software appliance 200, application(s) 205 and MiniOS 210 are pre-configured to function and operate together. As such, once software appliance 200 is placed on a computing platform or virtual machine, software appliance 200 only requires a configuration of the software appliance to the computing platform or virtual machine.

Additionally, software appliance 200 can be pre-configured for a specific client or computing platform on which it will be placed. Specifically, during creation of software appliance 200, MiniOS 210 and application(s) 205 of software appliance 200 can be pre-configured with the settings and parameters of the client or computing platform on which it will be placed. For example, if software appliance 200 includes a server OS and Email server application, the server OS and Email server application can be pre-configured to operate with the network settings of the computing platform it will be placed and the network it will serve. Accordingly, software appliance 200 needs only to be placed on the target client or computing platform without additional configuration. In embodiments, software appliance 200 can be installed to a variety of clients, servers or other target devices, such as network servers, personal computers, network-enabled cellular telephones, personal digital assistants, media players, and others, such as illustrated in FIG. 1 above.

Software appliance 200 can also be updated and upgraded by several different processes. Since software appliance 200 is a binary image, an updated or upgraded software appliance can be created as a completely new binary image of the entire software appliance incorporating the updates or upgrades. To update or upgrade software appliance 200 using a complete image, the updated or upgraded appliance can simply replace software appliance 200. Alternatively, software appliance 200 can be updated or upgraded incrementally. For each update or upgrade, the bits of the binary image required to update or upgrade software appliance 200 can be determined. To update or upgrade software appliance 200, the update bits can be added to software appliance 200 on a binary-difference basis.

Software appliance 200 can also be configured to communicate with a management tool 215. Management tool 215 can for example be utilized in order to startstop, configure, repair, and update software appliance 200. Management tool 215 can manage the entire software appliance 200, including both application(s) 205 and MiniOS 210. Likewise, management tool 215 can include multiple tools, for instance to manage application(s) 205 and MiniOS 210, separately.

According to embodiments, management tool 215 can be embedded in software appliance 200 itself. In such implementations, software appliance 200 can be managed from the particular computing platform on which it is placed.

Returning to FIG. 1, according to various embodiments, AS module 120 can be configured to build software hosted appliances for users 105 to be implemented in a hosted environment. AS module 120 can be configured to build the hosted appliances based on a request by a user 105. AS module 120 can be configured to build the requested appliance by retrieving the pre-configured appliance. Additionally, to build the hosted appliances, AS module 120 can be configured to combine the applications with MiniOS to provide an execution platform for the applications. Additionally, the AS module 120 can be configured to build the hosted appliances in a format supported by the hosted environment.

In embodiments, AS module 120 can be configured to receive a request to migrate the hosted appliances to an on-premise system. To achieve this, AS module 120 can be configured to retrieve the hosted appliances from the hosted environment. To migrate the hosted appliance, AS module 120 can be configured to convert the hosted appliances into a format capable of being supported by the on-premise systems. Additionally, to enhance migration, the hosted appliance can include metadata describing the configuration parameters of the hosted appliances. The metadata can be migrated with the converted appliances. Once converted, AS module 120 can provide the converted appliance to the on-premise system.

Figure 3:
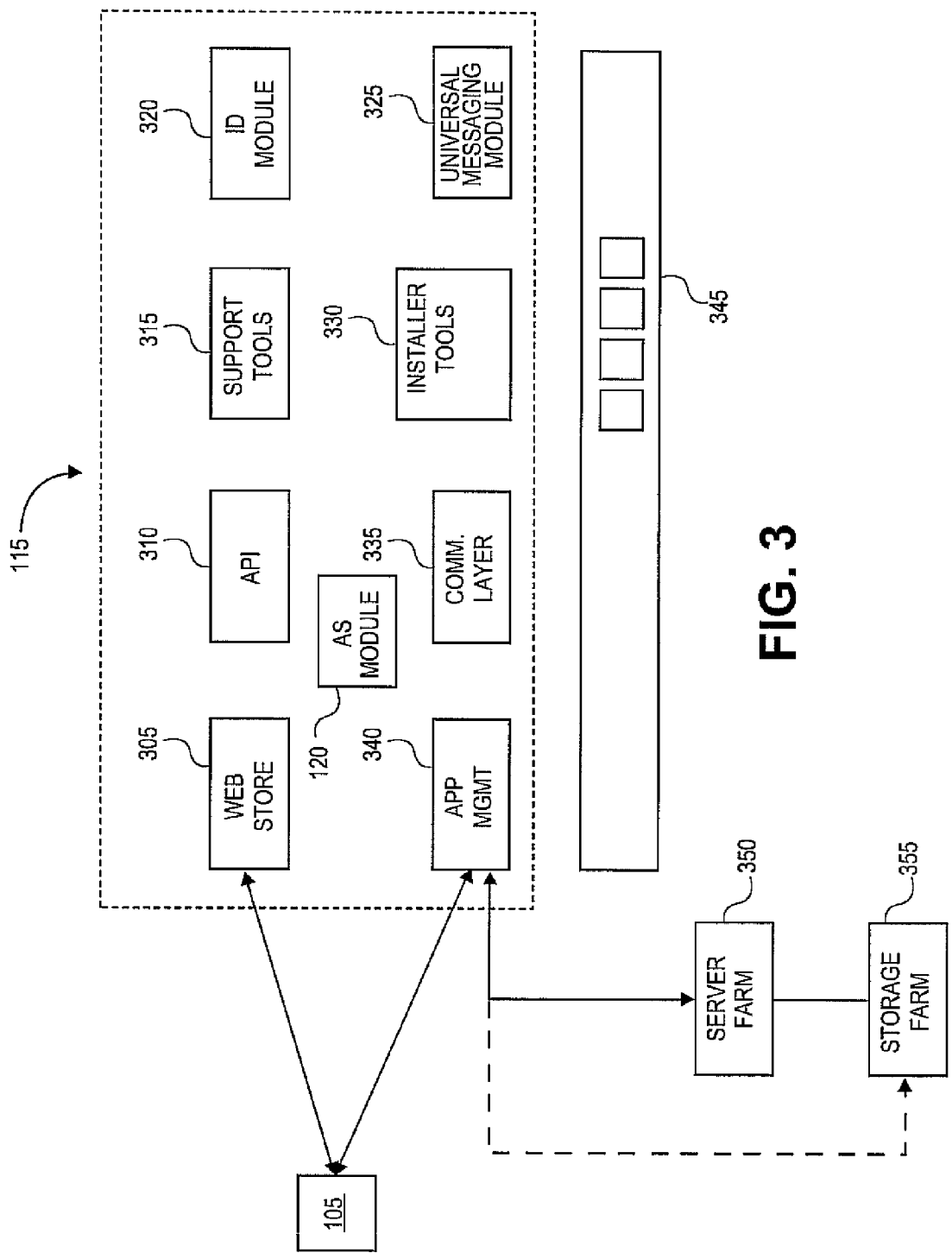
FIG. 3 illustrates an exemplary service portal of the system shown in FIG. 1 in accordance with another embodiment.

FIG. 3 illustrates a more detailed block diagram of web service portal 115 including AS module 120 in accordance with another embodiment. It should be readily apparent to those of ordinary skill in the art that web service portal 115 depicted in FIG. 3 represents a generalized schematic illustration and that other components may be added or existing components may be removed or modified.

As shown in FIG. 3, web service portal 115 can include a web store module 305 that a user can interface with the service portal. Web store module 305 can provide the graphical user interfaces ("GUIs") and associated functions and/or services for web service portal 115. As a non-limiting example, web store module 305 can generate a log-in GUI for a user to authenticate and enter web service portal 115.

Web store module 305 can couple with an application program interface ("API") module 310. API module 310 can be configured to provide an interface between the functions and/or services provided by web store module 305 and to the appropriate module of web service portal 115. More particularly, API module 310 can call or direct a requested function or service from the user to the respective module that provides that requested function or service. For example, a user may request a price of a product, e.g., product vending module, API module 310 can direct the request to a get price function in a support tools module 315. Additionally, a user may request a software appliance, API module 310 can direct the request to AS module 120.

API module 310 can also be configured to interface with support tools module 315. Support tools module 315 can be configured to provide the supporting software and hardware to implement the functionality of web service portal 115. Support tools module 315 can contain and provide access to databases that contain information such as product lines, software appliances services providers, on-line self-help (e.g., knowledgebase), etc. Support tools module 315 can also provide services like a chat service, a help desk, installation, provisioning, etc.

API module 310 can be further configured to couple with an identification ("ID") module 320. ID module 320 can be configured to provide identification management services for web service portal 115. ID module 320 can also store information related to users such as purchase history, user profile, usage history of the user, and entitlement data.

API module 310 can be further configured to couple with a universal messaging module 325. Universal messaging module 325 can be configured to provide a messaging application that unifies messages. More specifically, electronic mail ("email"), documents, and instant messaging can be linked in a single application. Universal messaging module 325 can also provide a mechanism for a user to view all the related documents for the user from email to Wiki pages.

An installer tools 330 can be coupled to API module 310. One of the services provided by web service portal 115 can be the purchase of software applications and software appliances provided by independent software vendors ("ISVs"). As part of the delivery of the software applications and appliances, the ISV can be required to maintain and update the installation tools to install their respective software applications and appliances. Accordingly, installer tools 330 can be a repository where independent software vendors can deposit their respective installation tools.

API module 310 can be further coupled to a communication layer 335 (labeled as COMM layer in FIG. 3). Communication layer 335 can be configured to provide the underlying services for the modules of web service portal 115 to communicate. For example, communication layer 335 can contain middleware for a product database to communicate with a graphical user interface requesting product description.

API module 310 can be further coupled to an application management module 340 (labeled as APP MGMT in FIG. 3). Application management module 340 can be configured to manage applications as requested by users. More specifically, a user may purchase a prepackaged software application pack (e.g., an operating system, electronic mail program and data mining program) from web service portal 115, which is stored in an application stack module 345. Application management module 340 can then deliver the purchased software stack, install and configure the software application stack at a third party site such as server farm 350 or store the software application stack in a storage farm 355 for the user to retrieve.

Server farm 350 can be configured to provide computing platforms for users to lease. Accordingly, users can have a backup version of their systems, a testing platform to perform quality assurance tests on new applications or new software appliances, execute a program requiring excessive MIPS, or any other similar computing task. Additionally, server farm 350 can be configured to store software appliances for download by users 105.

Storage farm 355 can be configured to provide storage space for users to lease. Accordingly, users can lease disk storage space to back up data, provide a hot data swap, or other storage intensive tasks. Additionally, storage farm 355 can be configured to store software appliances for download by users 105.

In some embodiments, AS module 120 can be configured to be executed in one of the other components (not shown). As illustrated, in other embodiments, AS module 120 can be executed as a standalone module.

Figure 4:
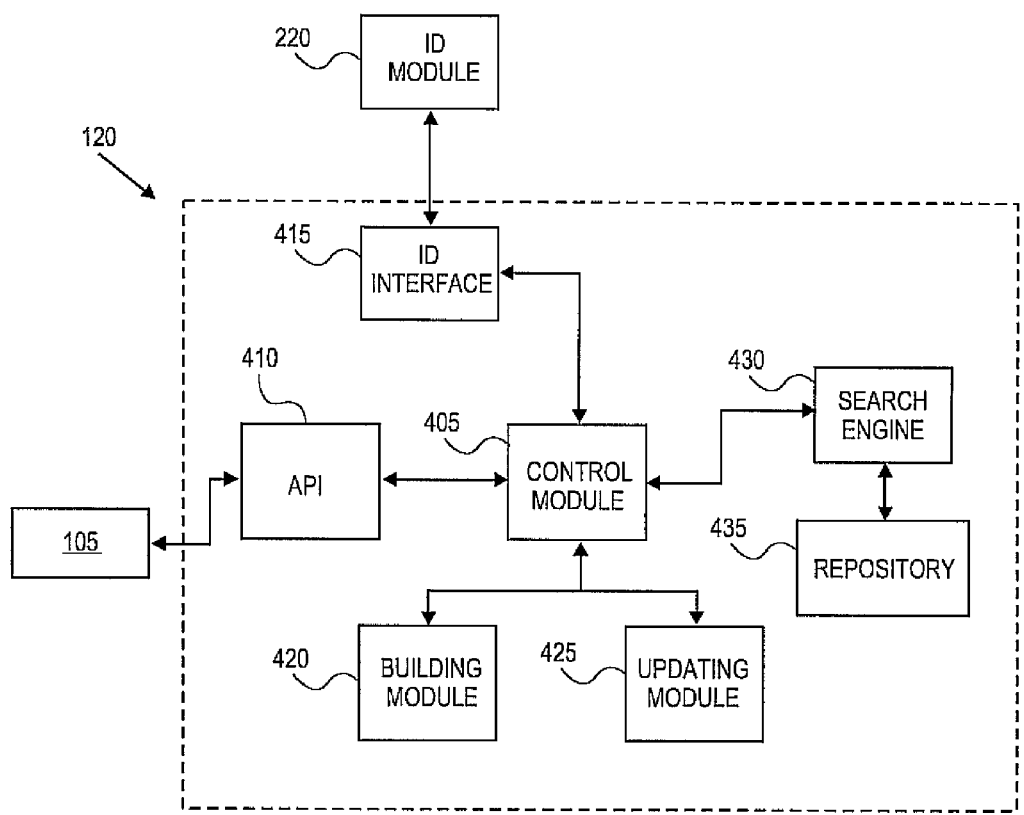
FIG. 4 depicts an exemplary AS module shown in FIG. 1 in accordance with yet another embodiment.

FIG. 4 depicts a more detailed block diagram of AS module 120 in accordance with another embodiment. It should be readily apparent to those of ordinary skill in the art that AS module 120 depicted in FIG. 4 represents a generalized schematic illustration and that other components may be added or existing components may be removed or modified.

As shown in FIG. 4, AS module 120 can comprise a control module 405, an application program interface ("API") 410, an identification ("ID") interface 415, a building module 420, an updating module 425, a search engine 430, and a repository 435. It should be readily obvious to one of ordinary skill in the art that the modules 405-435 can be implemented as software applications (programmed in C, C++, JAVA, PHP, etc.), hardware components (EEPROM, application specific integrated circuit, microprocessor, etc.) or combinations thereof.

Control module 405 can be configured to manage and interface with the other modules 410-435 to provide the functionality of the AS module 120 as described above and further described herein below. Additionally, control module 405 can be configured to interface with other modules such as ID module 220 via ID interface 415 as described above and further described herein below.

API 410 can be configured to generate GUIs, e.g. dialog boxes, web pages, as required by control module 405 and to provide an interface to other modules of web service portal 115. API 410 can be configured to operate in conjunction with web store 305 and API 310. For example, when a user 105 requests a software appliance related to a service or product via web store 305, API 310 can pass the request to API 410. One skilled in the art will realize that API 410 is optional and that the functionality of API 410 can be performed by API 410.

AS module 120 can be configured to receive a request for a software appliance to be implemented in a hosted environment. The hosted environment can be a cloud computing environment or server environment such as server farm 350. In particular, API 410 can be configured to receive a request for a software appliance via web service portal 115. As such, API 410 can be configured to generate web pages in order to receive the request.

Likewise, API 410 can be configured to operate in conjunction with other modules of web service portal 115 such as universal messaging module 325. For example, a user 105 can submit a request for a software appliance in a message, such as an email. As such, API 310 can pass the request from universal messaging module 325 to API 410.

Control module 405 can be configured to receive the user's request for a software appliance via API 410. Control module 405 can be configured to receive a request to build an appliance. In order to build the requested appliance, control module 405 can be coupled to repository 435. Repository 435 can be implemented in any structure such as a database. For example, repository 435 can be implemented utilizing any type of conventional database architecture using open source technologies, proprietary technologies, or combinations thereof.

Repository 435 can be configured to store various pre-built software appliances based on the different functionally typically requested by users. For example, repository 435 can maintain various pre-built software appliances for roles such as Email Server appliance, application server appliance, customer relation management (CRM) appliance, enterprise resource planning (ERP) appliance, and the like. Repository 435 can be configured to store the binary image of the pre-built appliance. Repository 435 can also be configured to store a recipe of the software appliance. The recipe describes the bits that make up the software appliance.

As mentioned above in FIG. 2, the software appliance includes one or more application and MiniOS to support the applications. In addition to storing pre-built appliances and recipes, repository 435 can also be configured to store individual operating systems and individual applications. Repository 435 also can be configured to store versions of MiniOS to support individual applications. Repository 435 can be configured to store the individual applications, individual operating systems, and versions of MiniOS as separate binary images.

In order to build the appliance, control module 405 can be configured to retrieve the pre-built appliance, the recipe, and/or the necessary components to build the hosted appliance based on the request, from repository 435. In order to locate and retrieve the pre-built appliance, the recipe, and/or components of the custom appliance, control module 405 can be coupled to search engine 430. Search engine 430 can be configured to allow control module 405 to search repository 435. Search engine 430 can allow control module 405 to search the repository based on the contents of the request.

In order to build the requested appliance, control module 405 can be coupled to building module 420. After retrieving the pre-built appliance, the recipe, and/or components of the custom appliance, control module 405 can be configured to pass the retrieved pre-built appliance, the recipe, and/or components of the custom appliance to building module 420. Building module 420 can be configured to build the appliance from the pre-built appliance, the recipe and/or the components of the hosted appliance.

For example, if building module 420 receives a pre-built appliance, building module 420 can be configured to append a unique serial number to the pre-built appliance. Additionally, if building module 420 receives an application and a version of MiniOS, building module 420 can be configured to combine the bits of the binary image of the application and version of MiniOS in order to create the binary image of the custom software appliance. Building module 420 can be configured to use the recipe to build the appliance.

Additional, if building module 420 receives an application and complete OS, building module 420 can be configured to generate a version of MiniOS to support the received application. Building module 420 can be configured to combine the bits of the binary image generated for the version of the MiniOS and the received application. Building module 420 can be configured to generate a unique serial number for the custom appliance and append the serial number to the hosted appliance.

In embodiments, during the building process, the building module 420 can be configured to build the hosted appliance in a format supported by the hosted environment. For example, the building module 420 can build the hosted appliance as a binary image in a format, such EC2, capable of being implemented in the hosted environment.

After building the appliance, control module 405 can be configured to provide the hosted appliance to the hosted environment. Control module 405 can be configured to pass the hosted appliance to API 410. API 410 can then be configured to provide the appliance to the hosted environment. Likewise, API 410 can be configured to pass the hosted appliance to universal messaging module 325 in order to be transmitted to the hosted environment. For example, universal messaging module 325 can transmit the complete appliance to the hosted environment in an email message.

In the building process described above, control module 405 can also be configured to include identifying information of the user in the hosted appliance. As such, control module 405 can be configured to append ID information of the user requesting the appliance to the complete appliance. To achieve this, control module 305 can be coupled to ID interface 415. ID interface 415 can be coupled to ID module 320 of web service portal 115. Control module 405 can utilize ID interface 415 to retrieve the ID information for the user.

In embodiments, AS module 120 can be configured to include metadata in the hosted appliance. The metadata can be configured to track and store the configuration information of the hosted appliance. The configuration information can include data required to implement the hosted appliance as requested by the user, data necessary to allow the components of the hosted appliance to function together, and data necessary to allow the hosted appliance to cooperate with the hosted environment. The metadata can be created in any format such as a tuple or extensible markup language (XML) file.

In embodiments, once the hosted application has been provided to the hosted environment, AS module 120 can be configured to receive a request from the user to migrate the hosted appliance to an on-premise system. The request can include the format of on-premise system in order to support the hosted appliance. In particular, API 410 can be configured to receive a request for a software appliance via web service portal 115. As such, API 410 can be configured to generate web pages in order to receive the request. Likewise, API 410 can be configured to operate in conjunction with other modules of web service portal 115 such as universal messaging module 325. For example, a user 105 can submit a request for a software appliance in a message, such as an email. As such, API 310 can pass the request from universal messaging module 325 to API 410.

Once the request to migrate is received, AS module 120 can be configured to retrieve the hosted appliance from the hosted environment. For example, control module 405 can instruct API 410 to retrieve the hosted appliance from the hosted environment. Once retrieved, control module 405 can pass the hosted appliance to building module 420. Building module 420 can be configured to convert the hosted appliance from its current format into a format capable of being supported by the on-premise system. The on-premise format can be received in the request from the user. For example, building module 420 can convert the binary image of the hosted appliance from a format such as EC2 to a binary image in a format supported by the on-premise system such as virtual machine (VM) format.

In embodiments, building module 420 can also be configured to migrate the metadata to the converted appliance. As such, the configuration of the hosted appliance can be migrated to the converted appliance to allow the converted appliance to operate in the on-premise systems.

After conversion, AS module 120 can provide the converted appliance to the on-premise system. For example, control module 405 can be configured to pass the converted appliance to API 410. API 410 can then be configured to provide the converted appliance to the on-premise system or the user. API 410 can be configured to pass the converted appliance to universal messaging module 325 in order to be transmitted to the user or on-premise system. For example, universal messaging module 325 can transmit the complete appliance to the user or on-premise system in an email message.

AS module 120 can be configured to maintain a record of appliances provided to users. In particular, control module 405 can be configured to generate a record of appliances provided to users. The record can include the all appliances provided to the user associated with the ID information of the user. The records can also include the unique serial numbers of the appliances.

AS module 120 can also be configured to update and upgrade previously provided appliances. To achieve this, control module 405 can be coupled to updating module 425. Updating module 425 can be configured to update and upgrade software appliances by several different processes.

Since a software appliance is a binary image, updating module 425 can be configured to updated or upgrade a software appliance by creating a completely new binary image of the entire software appliance incorporating the updates or upgrades. To update or upgrade the software appliance using a complete image, updating module 425 can be configured to create the updated or upgraded appliance. AS module 120 can be configured to provide the updated or upgraded appliance to the user to simply replace the existing software appliance.

Alternatively, updating module 425 can be configured to update or upgrade a software appliance incrementally. For each update or upgrade, updating module 425 can be configured to determine the bits of the binary image required to update or upgrade a software appliance. AS module 120 can be configured to provide the update or upgrade bits to the user. To update or upgrade the software appliance, the user can add the update or upgrade bits to the software appliance on a binary-difference basis.

AS module 120 can be configured to build the software appliance to include a management tool. AS module 120 can be configured to embed the management tool in the complete software appliance. The management tool can be configured to provide control, management, and maintenance of the software appliance. For example, the management tool can be utilized in order to start/stop, configure, repair, and update a software appliance. The management tool can be configured to manage the entire software appliance, including both applications and MiniOS of the software appliance. Likewise, the management tool can be configured to include multiple tools, for instance to manage applications and MiniOS of the software appliance. Likewise, the management tool can be a module in AS module 120 capable of communicating with the appliances.

Figure 5:
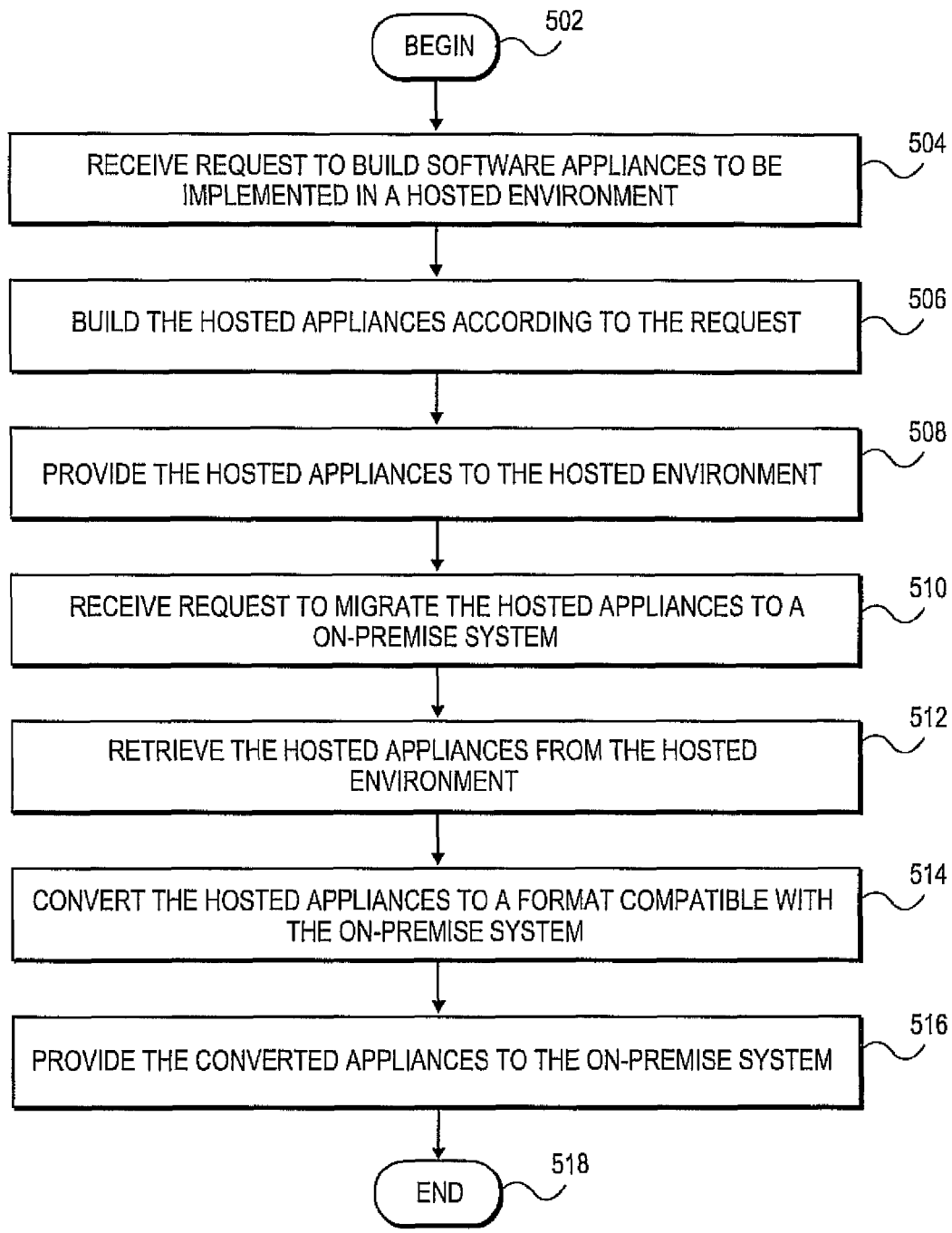
FIG. 5 illustrates a flowchart for overall appliance building in accordance with yet another embodiment.

FIG. 5 illustrates a flow diagram of overall appliance building, according to embodiments of the present teachings. In 502, processing can begin. In 504, AS module 120 can receive a request to build software appliances from user 105 to be implemented in a hosted environment. In 506, AS module 120 can build the hosted appliance. AS module 120 can build the requested appliance by retrieving the pre-configured appliance. Additionally, to build the hosted appliance, AS module 120 can combine the applications with MiniOS to provide an execution platform for the applications. Additionally, the AS module 120 can build the hosted appliances in a format supported by the hosted environment. After building, in 508, AS module 120 can provide the hosted appliance to the hosted environment.

In 510, AS module 120 can receive a request to migrate the hosted appliances to an on-premise system. In 512, AS module 120 can retrieve the hosted appliances from the hosted environment. To migrate the hosted appliance, in 514 AS module 120 can convert the hosted appliances into a format capable of being supported by the on-premise systems. Additionally, to enhance migration, the hosted appliance can include metadata describing the configuration parameters of the hosted appliances. The metadata can be migrated with the converted appliances. Once converted, in 516, AS module 120 can provide the converted appliance to the on-premise system or the user 105.

Then, in 518, the processes can terminate, but the process can return to any point and repeat.

Figure 6:
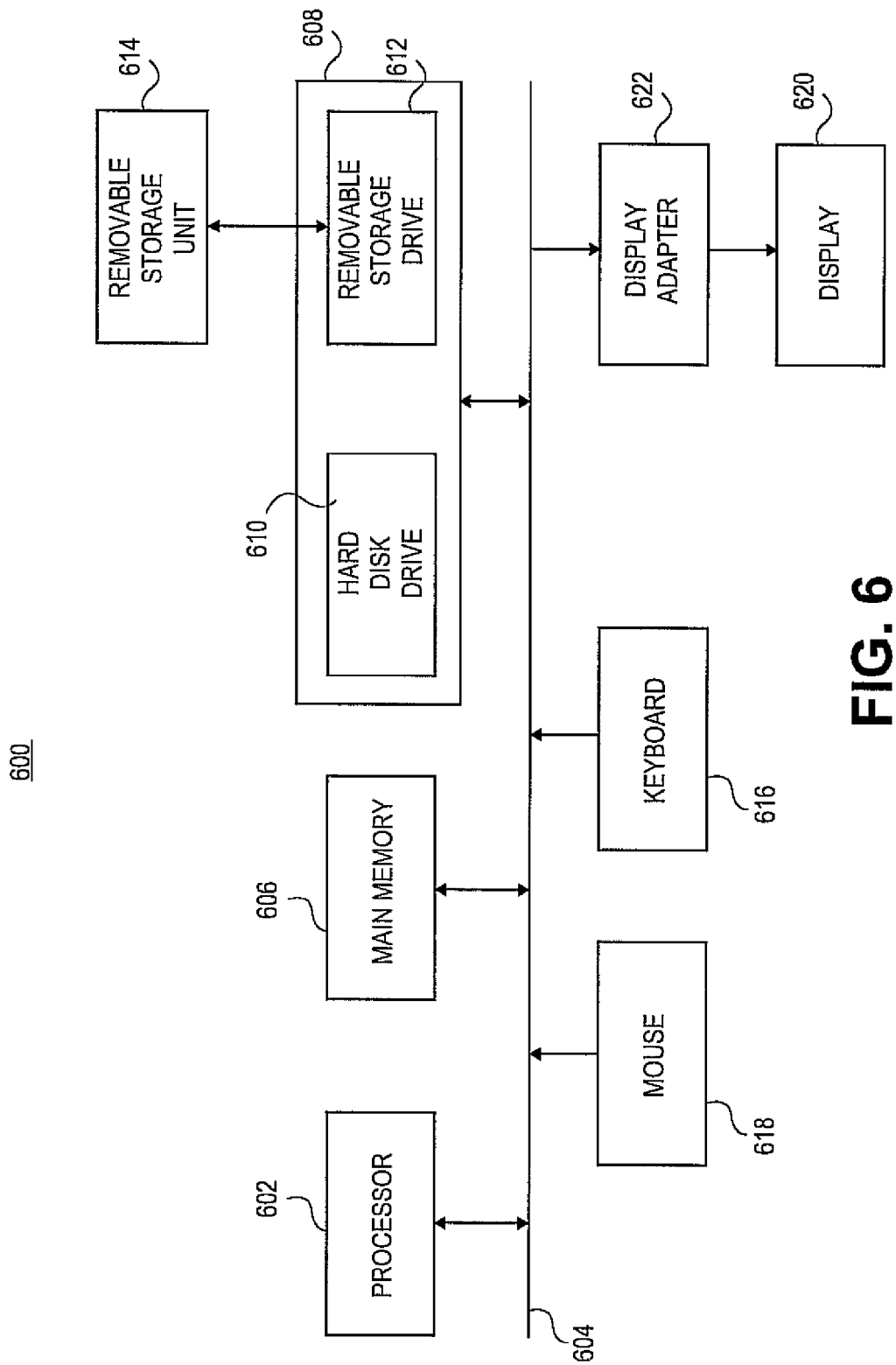
FIG. 6 depicts an exemplary computing platform in accordance with yet mother embodiment.

FIG. 6 illustrates an exemplary block diagram of a computing platform 600 where an embodiment may be practiced. The functions of the AS module 120 can be implemented in program code and executed by computing platform 600. AS module 120 may be implemented in computer languages such as PASCAL, C, C++, JAVA, etc.

As shown in FIG. 6, computing platform 600 includes one or more processors, such as processor 602 that provide an execution platform for embodiments of AS module 120. Commands and data from processor 602 are communicated over a communication bus 604. Computing platform 600 also includes a main memory 606, such as a Random Access Memory (RAM), where AS module 120 can be executed during runtime, and a secondary memory 608. Secondary memory 608 includes, for example, a hard disk drive 610 and/or a removable storage drive 612, representing a floppy diskette drive, a magnetic tape drive, a compact disk drive, etc., where a copy of a computer program embodiment for AS module 120 can be stored. Removable storage drive 612 reads from and/or writes to a removable storage unit 614 in a well-known manner. A user interfaces with the AS module 120 with a keyboard 616, a mouse 618, and a display 620. Display adapter 622 interfaces with the communication bus 604 and display 620. Display adapter 622 also receives display data from processor 602 and converts the display data into display commands for display 620.

Additionally, software appliances including management tools, such as software appliance 200, can be implemented on an exemplary computing platform 600. For example, processor 602 can provide an execution platform for embodiments of the software appliance. The software appliance can be executed during runtime on main memory 606. The binary image of the software appliance can be stored in secondary memory 608.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method comprising:
    storing a plurality of recipes in a repository, wherein the software appliance comprises a plurality of bits described by the plurality of recipes;
    receiving a request to migrate the software appliance from a hosted environment supporting appliances in a first format to an on-premise system supporting appliances in a second format, wherein the request comprises information specifying the second format supported by the on-premise system;
    converting, by a processor, the software appliance from the first format supported by the hosted environment to the second format supported by the on-premise system; and
    updating the converted software appliance, wherein the updating comprises determining a plurality of incremental update bits of a binary image representing the converted software appliance that are used to update the converted software appliance and adding the plurality of incremental update bits to the software appliance on a bit-level_binary-difference basis, and wherein determining the plurality of incremental update bits comprises determining a recipe of the plurality of recipes corresponding to the software appliance in the first format, determining a modified recipe of the plurality of recipes corresponding to the converted software appliance in the second format, and comparing the recipe and the modified recipe to determine the plurality of incremental update bits.

2. The method of claim 1, further comprising:
    providing the converted software appliance to the on-premise system.

3. The method of claim 1, further comprising:
    receiving a request to build the software appliance;
    building the software appliance in the first format supported by the hosted environment; and
    providing the software appliance to the hosted environment in the first format.

4. The method of claim 1, wherein converting comprises converting a first binary image in the first format to a second binary image in the second format.

5. The method of claim 1, wherein the software appliance comprises metadata specifying configuration parameters for the software appliance.

6. The method of claim 5, wherein converting comprises migrating the metadata to the converted software appliance.

7. A system comprising:
    a processor;
    a memory coupled to the processor;
    a network interface to at least one network; and
    an application support module, executable by the processor from the memory, communicating with the network interface, the application support module to:
        store a plurality of recipes in a repository, wherein the software appliance comprises a plurality of bits described by the plurality of recipes;
        receive a request to migrate the software appliance from a hosted environment supporting appliances in a first format to an on-premise system supporting appliances in a second format, wherein the request comprises information specifying the second format supported by the on-premise system;
        convert the software appliance from the first format supported by the hosted environment to the second format supported by the on-premise system; and
        update the converted software appliance, wherein the updating comprises determining a plurality of incremental update bits of a binary image representing the converted software appliance that are used to update the converted software appliance and adding the plurality of incremental update bits to the software appliance on a bit-level binary-difference basis, and wherein to determine the plurality of incremental update bits, the application support module to determine a recipe of the plurality of recipes corresponding to the software appliance in the first format, determine a modified recipe of the plurality of recipes corresponding to the converted software appliance in the second format, and compare the recipe and the modified recipe to determine the plurality of incremental update bits.

8. The system of claim 7, the application support module further to:
    provide the converted software appliance to the on-premise system.

9. The system of claim 7, the application support module further to:
    receive a request to build the software appliance;
    build the software appliance in the first format supported by the hosted environment; and
    provide the software appliance to the hosted environment in the first format.

10. The system of claim 7, wherein converting comprises converting a first binary image in the first format to a second binary image in the second format.

11. The system of claim 7, wherein the software appliance comprises metadata specifying configuration parameters for the software appliance.

12. The system of claim 11, wherein converting comprises migrating the metadata to the converted software appliance.

13. A non-transitory computer readable storage medium including instructions that, when executed by a processor, cause the processor to perform operations comprising:

store a plurality of recipes in a repository, wherein the software appliance comprises a plurality of bits described by the plurality of recipes;

receiving, at an interface provided by an appliance support module at a web service portal, a request to migrate the software appliance from a hosted environment supporting appliances in a first format to an on-premise system supporting appliances in a second format, wherein the request is received from a user of the web service portal and comprises information specifying the second format supported by the on-premise system;

converting, by the processor, the software appliance from the first format supported by the hosted environment to the second format supported by the on-premise system; and updating the converted software appliance, wherein the updating comprises determining a plurality of incremental update bits of a binary image representing the converted software appliance that are used to update the converted software appliance and adding the plurality of incremental update bits to the software appliance on a bit-level_binary-difference basis, and wherein determining the plurality of incremental update bits comprises determining a recipe of the plurality of recipes corresponding to the software appliance in the first format, determining a modified recipe of the plurality of recipes corresponding to the converted software appliance in the second format, and comparing the recipe and the modified recipe to determine the plurality of incremental update bits.

14. The non-transitory computer readable storage medium of claim 13, further comprising:
providing the converted software appliance to the on-premise system.

15. The non-transitory computer readable storage medium of claim 13, further comprising:
receiving a request to build the software appliance;
building the software appliance in the first format supported by the hosted environment; and
providing the software appliance to the hosted environment in the first format.

16. The non-transitory computer readable storage medium of claim 13, wherein converting comprises converting a first binary image in the first format to a second binary image in the second format.

17. The non-transitory computer readable storage medium of claim 13, wherein the software appliance comprises metadata specifying configuration parameters for the software appliance.

18. The non-transitory computer readable storage medium of claim 17, wherein converting comprises migrating the metadata to the converted software appliance.

* * * * *